July 18, 1939.  J. L. ATWOOD ET AL  2,166,564
AIRPLANE HAVING FOLDING WINGS
Filed March 4, 1936  7 Sheets-Sheet 1
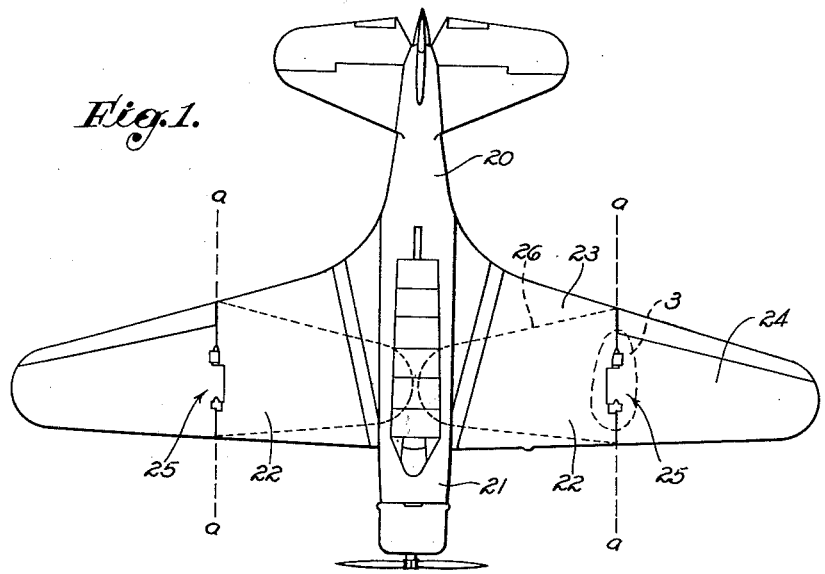
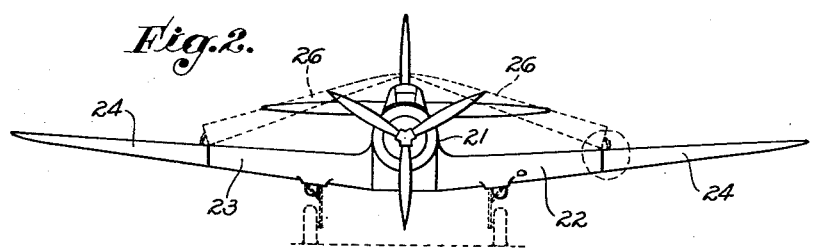
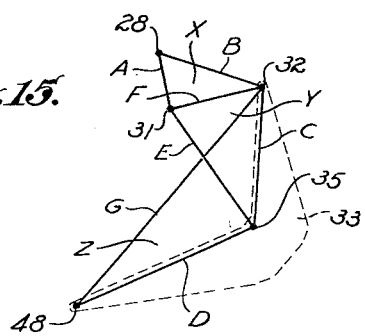
INVENTORS
JOHN L. ATWOOD
VLADIMIR H. PAVLECKA
By Fred W. Lamm
ATTORNEY.

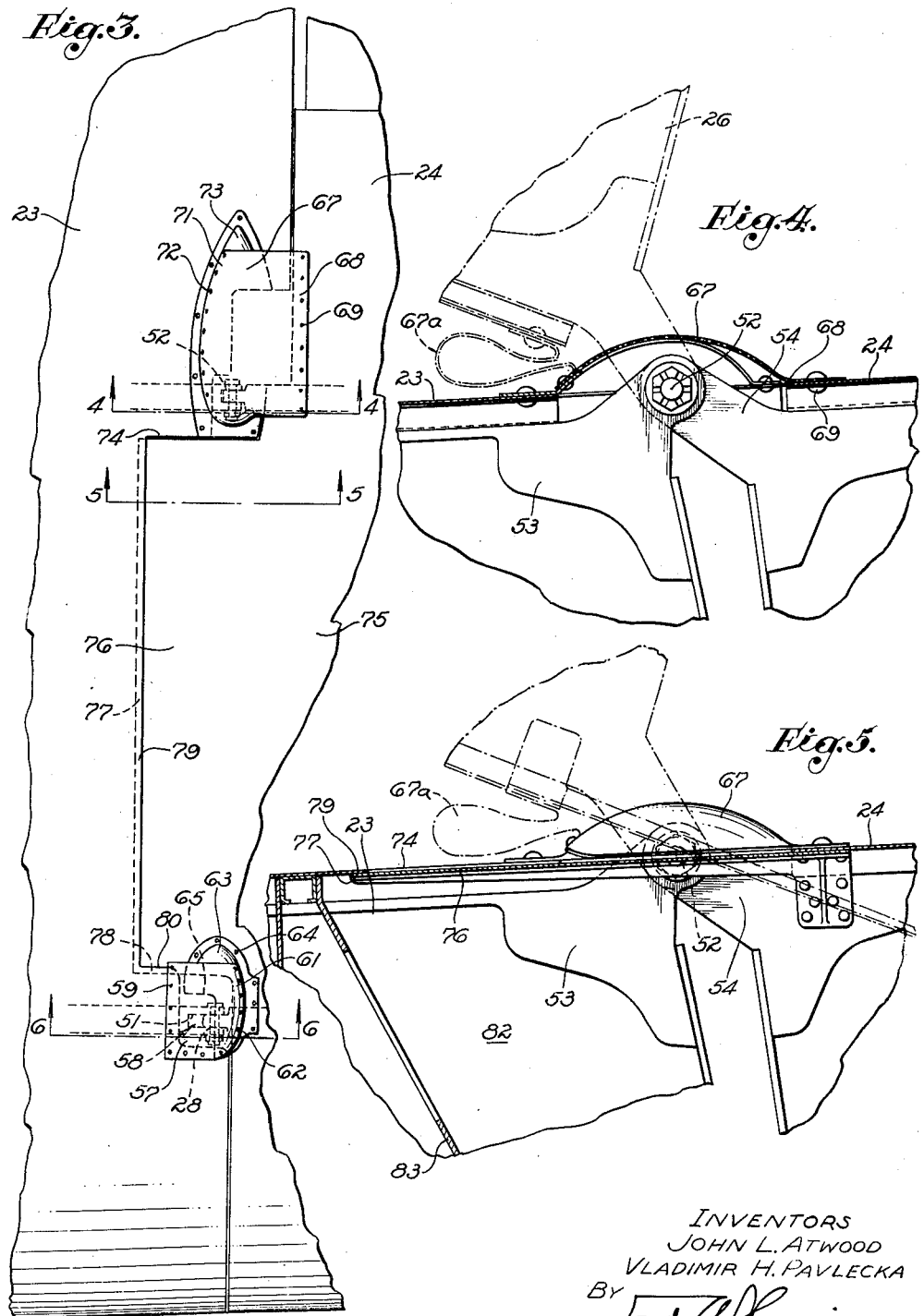

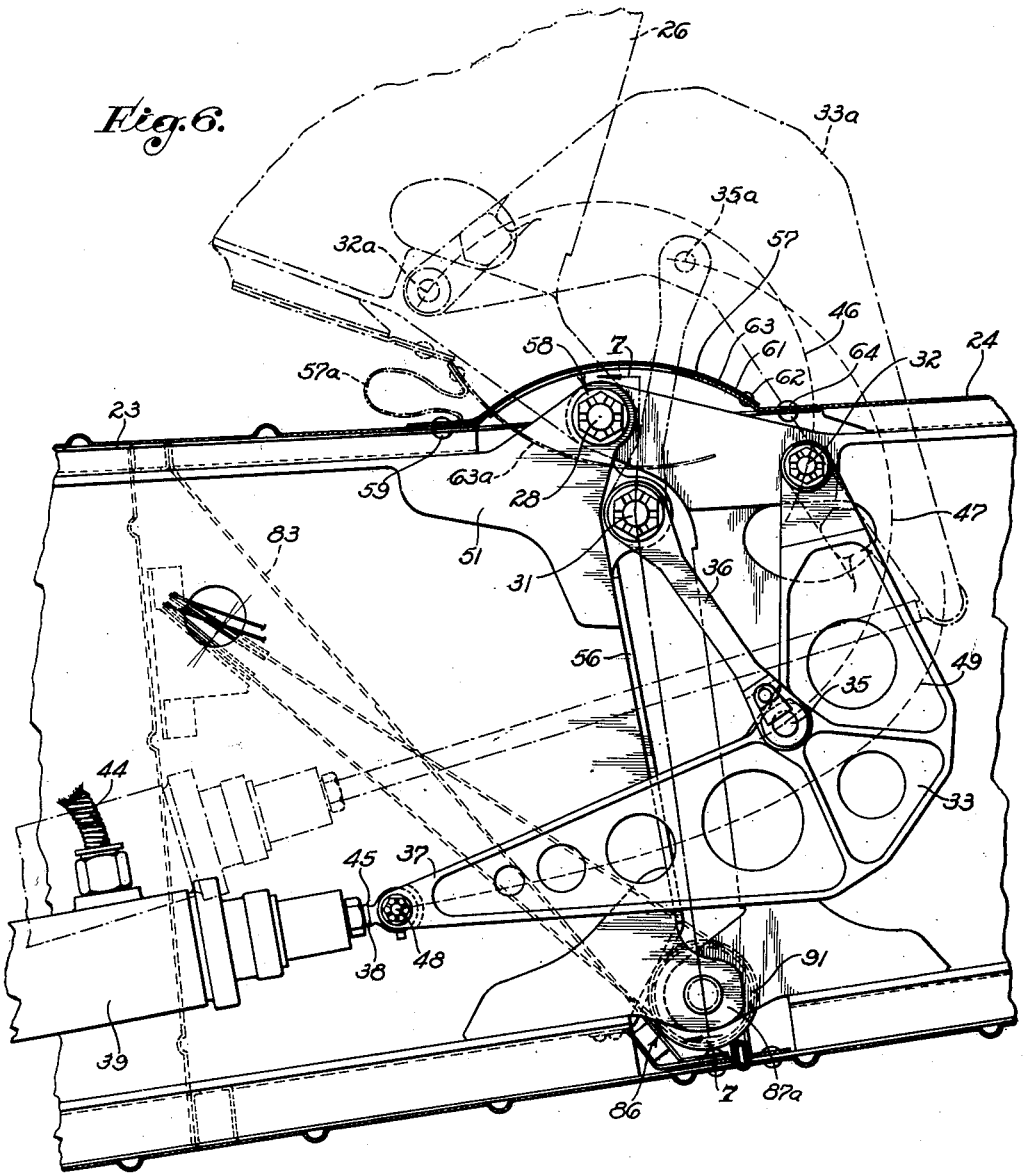

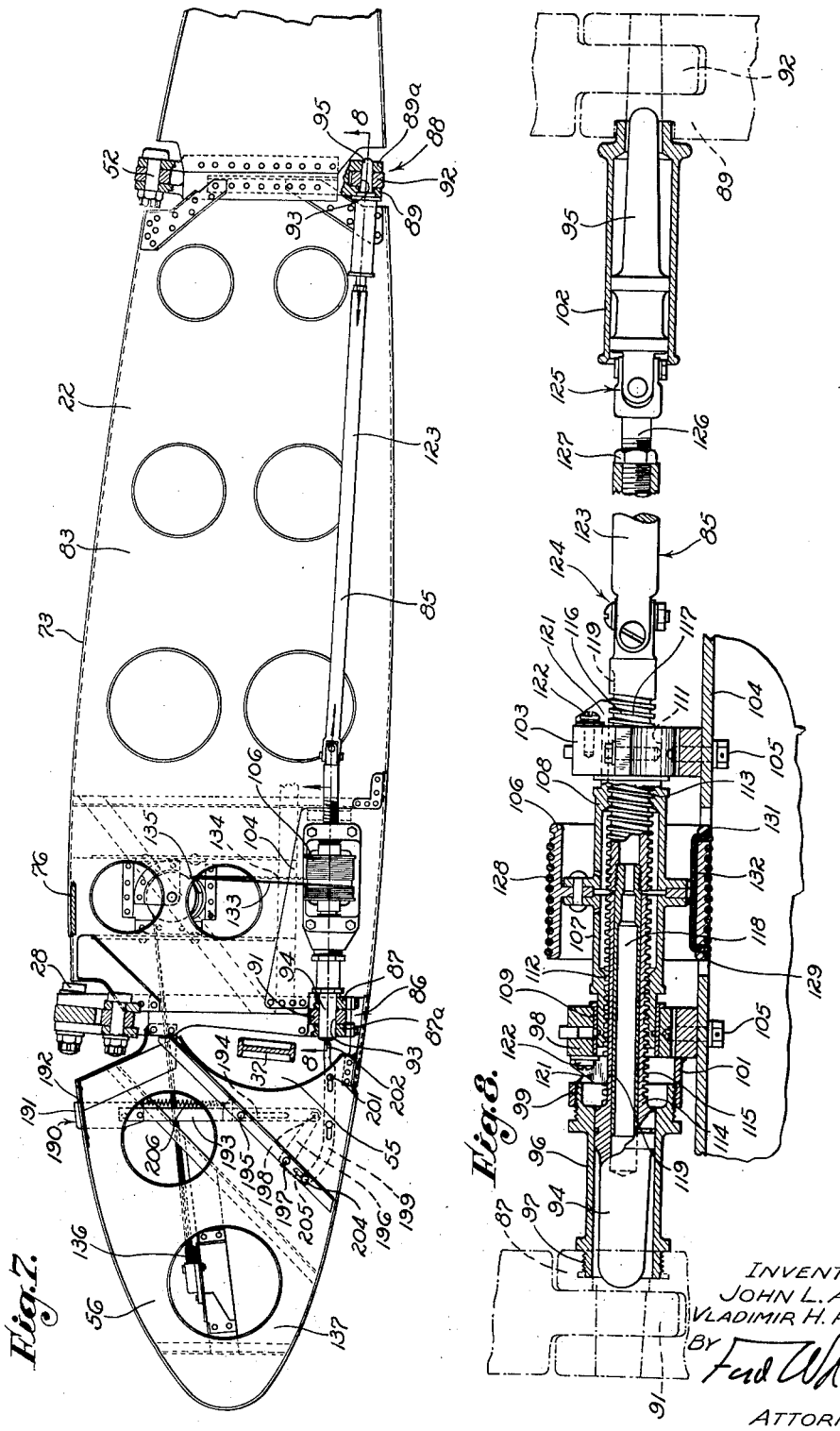

July 18, 1939. J. L. ATWOOD ET AL 2,166,564
AIRPLANE HAVING FOLDING WINGS
Filed March 4, 1936 7 Sheets-Sheet 5
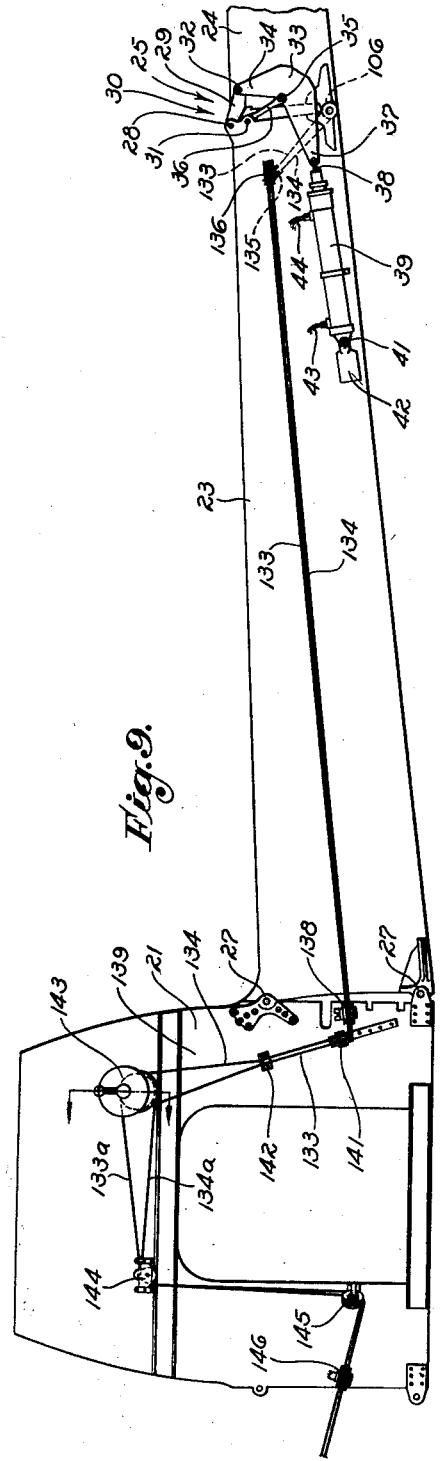
INVENTORS
JOHN L. ATWOOD
VLADIMIR H. PAVLECKA
BY Fred W Lewis
ATTORNEY.

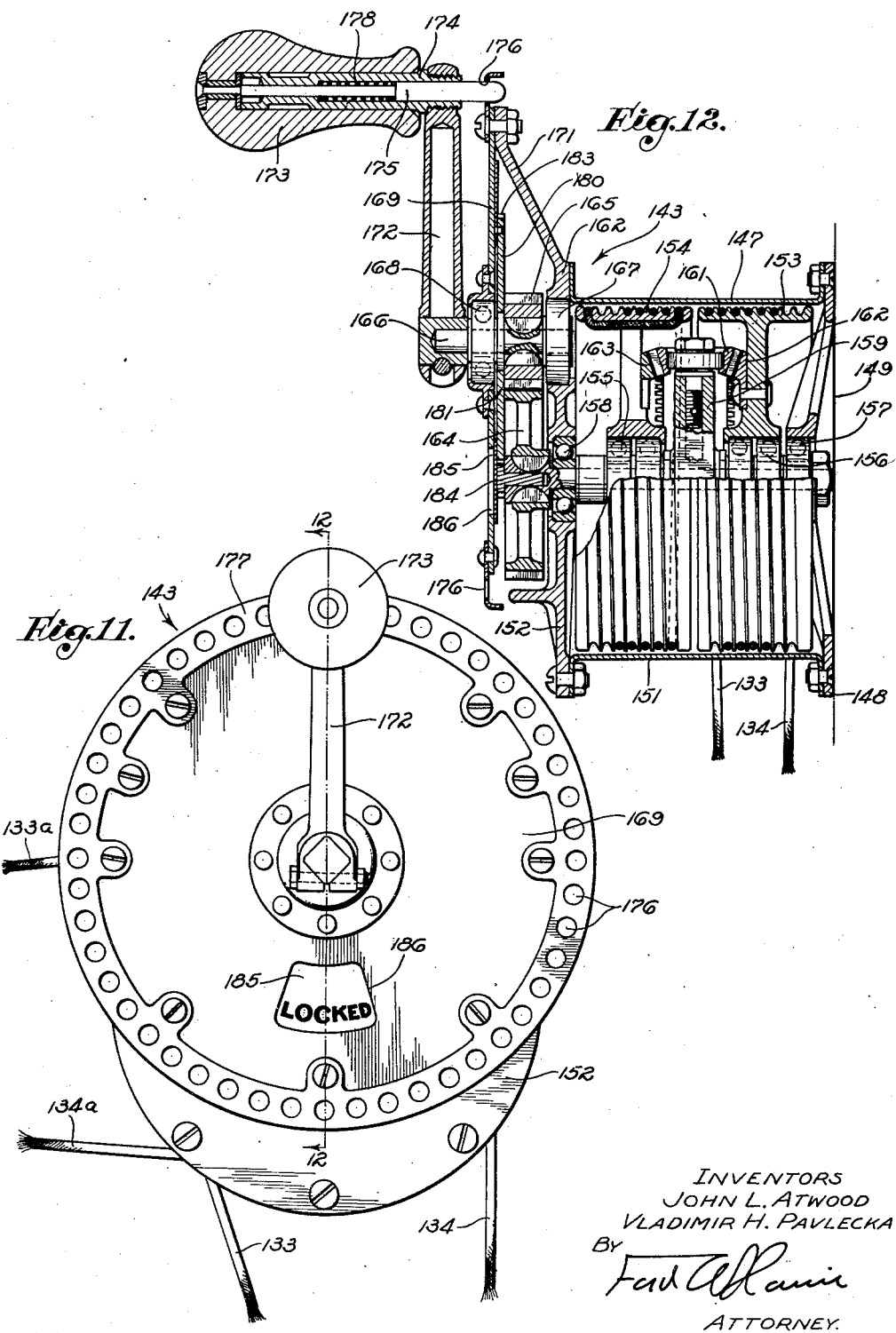

July 18, 1939.  J. L. ATWOOD ET AL  2,166,564
AIRPLANE HAVING FOLDING WINGS
Filed March 4, 1936  7 Sheets-Sheet 7
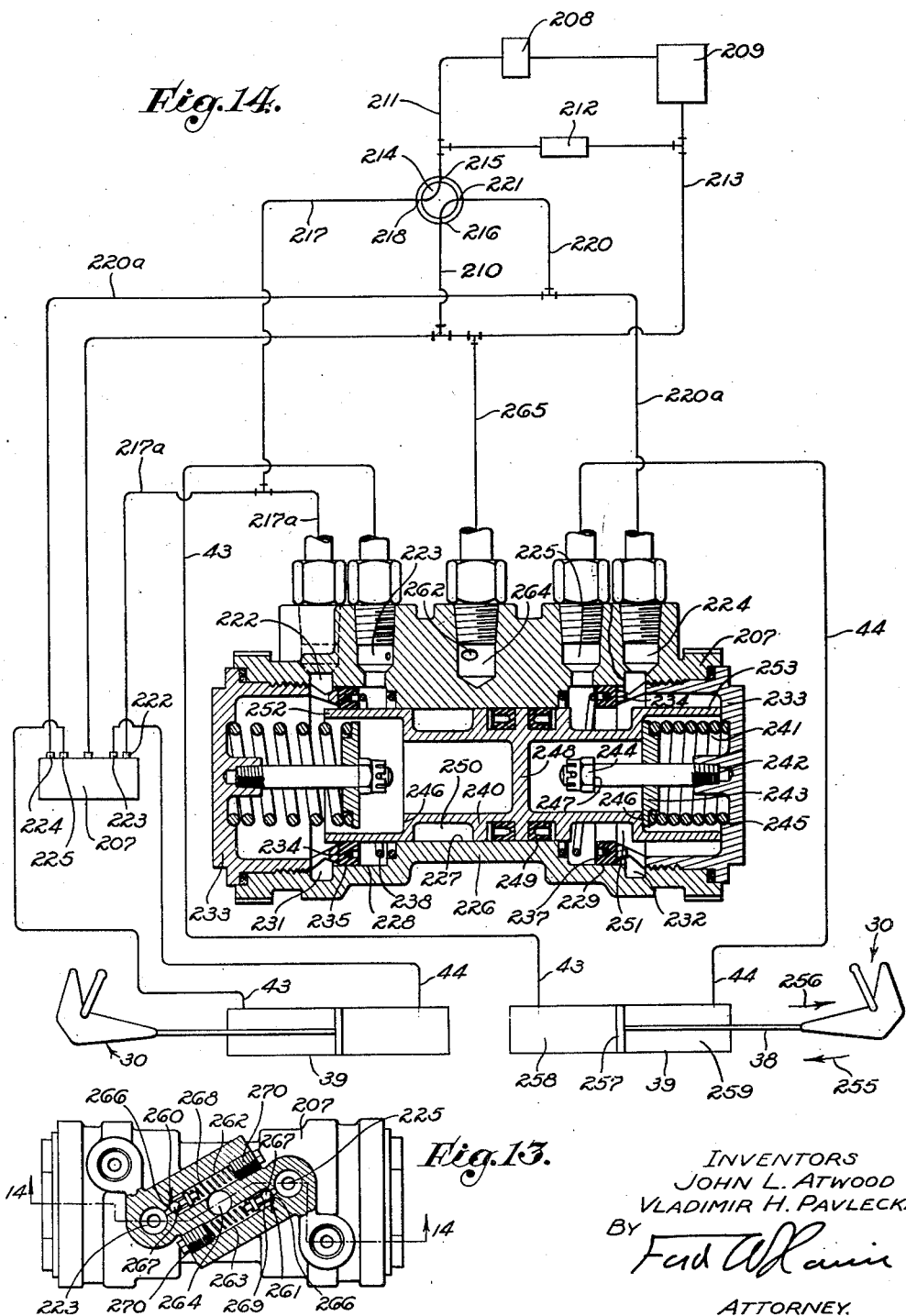
Fig.14.
Fig.13.
INVENTORS
JOHN L. ATWOOD
VLADIMIR H. PAVLECKA
BY
ATTORNEY.

Patented July 18, 1939

2,166,564

UNITED STATES PATENT OFFICE 2,166,564

AIRPLANE HAVING FOLDING WINGS

John L. Atwood and Vladimir H. Pavlecka, Santa Monica, Calif., assignors to Douglas Aircraft Company, Inc., Santa Monica, Calif., a corporation of Delaware Application March 4, 1936, Serial No. 66,999

34 Claims. (Cl. 244—49)

Our invention relates to aerial vehicles of winged type, and relates in particular to a construction suitable for use in aerial vehicles wherein wing members are mounted so as to be extended or retracted with respect to the body or fuselage, and having means adapted to be operated by a person on or in the aerial vehicle to extend or retract the wing members and positively lock the same in desired positions.

Although the principles of the invention may be embodied in various types of aerial vehicles, the greatest advantage thereof we believe is to be obtained in monoplane or internally braced wing construction, and therefore in this application we are disclosing the invention as embodied in a monoplane. The problem of storing airplanes so that they will occupy a minimum of floor space has been recognized for some time, and various types of folding wings for airplanes have been devised with a view to reducing the wing spread so as to make it possible to store them in a smaller area than is required for their storage when the wings are in extended or flight position. In our present invention it is an object to provide a winged aerial vehicle not only having wing members which may be retracted, but also having a device which is controlled or actuated by a person in the aerial vehicle, such, for example, as the pilot in the cockpit, to accomplish the retraction and also the extension of the wing members without the assistance of persons outside the aerial vehicle.

It is an object of the invention to provide an airplane having a foldable wing member which may be swung between retracted and extended positions, said airplane having also locking means for positively securing the wing members in extended or flight position, and means operated or controlled by a person within the airplane to effectuate or release this locking means as desired and without assistance from persons outside the airplane. In our present invention the airplane may be landed, the wing locking means released, and the wings moved into retracted position by the pilot or other person within the airplane, after which the airplane may be moved into a storage space. When the use of the airplane is again desired, it may be moved out of the storage space, or to the place from which it is to take off, and then without outside assistance the pilot may actuate the control and operating mechanism so as to move the wing members into extended or flight position and then effectuate the locking means so that these wing members will then be positively secured in position for flight and there positively held during flight.

It is an object of the invention to provide an airplane having a wing member hinged to the remaining part of the airplane structure in such a manner that it may be swung upwardly around the hinge into a position overlying that portion or other portion of the airplane to which it is hinged.

It is a further object of the invention to provide an airplane having a retractible wing member and hydraulic means for moving this wing member from one position to another. In the invention ample force or power for moving the wing member is produced in a mechanism having minimum weight and likewise ease and positiveness of control and operation by a person within the airplane.

It is a further object of the invention to provide an airplane having a wing member hinged on an essentially horizontal axis so that it may be swung upward from an extended position around its hinge, through a vertical plane, to a reclining position on the opposite side of the vertical plane, and power means operable to apply a positive force to swing the wing member upward from either of said positions to and through said vertical plane and to then apply a positive force to support the wing member as it swings by gravity from a point in or near said vertical plane to the other of said positions.

It is an object of the invention to provide an airplane having a folding wing and means disposed within the wing for moving the same, and it is also an object of the invention to provide a wing locking means situated within the wing and being operative by remote control from the cockpit of the airplane to either lock or release the wing.

It is a further object of the invention to provide a monoplane having a wing member hinged on an axis extending lengthwise of the monoplane so that this wing member may be swung around the hinge through an angle greater than 90°, whereupon the outer end of the wing member will lie adjacent the body or central portion of the monoplane.

It is a further object of the invention to provide an operating means for a folding wing which will be contained within an internally braced or hollow wing and will apply its greatest moving force to the folding part of the wing when such folding part of the wing is in positions requiring greatest force to move the same.

It is a further object of the invention to provide a hydraulic operating mechanism for a folding wing having automatic means for preventing uncontrolled movement of the wing by forces applied thereto by means other than the hydraulic mechanism. For example, when a folding wing is in a partly raised position, gravity exerts a force tending to move it, and also the force of a wind relative to the wing may tend to move it in the direction in which it is being moved by the hydraulic actuating mechanism. In our invention we have provided what we term a shuttle check valve which prevents the movement of the wing other than by the direct action of the hydraulic mechanism.

In accordance with the foregoing it is broadly an object of our invention to provide an aerial vehicle having a retractible wing member and means in the aerial vehicle, operated by a person in the aerial vehicle, for moving and controlling the movement of the wing in such a manner that the wing may be moved between extended and retracted positions in accordance with the will of an operator within the aerial vehicle, but wherein a restraining means is provided so that the wing cannot be moved by a force which is externally exerted; therefore, there is no danger of injury to the aerial vehicle, the folding wing, or the operating mechanism as the result of the wing being moved rapidly and forcibly in an uncontrolled manner into either of its extreme positions.

A further object of the invention is to provide an improved means for positively locking the wing in a desired position, for example, in position extended for flight.

Further objects and advantages of the invention will be brought out throughout the following part of the specification.

Referring to the drawings, which are for illustrative purposes only:

Fig. 1 is a plan view of an airplane embodying the invention.

Fig. 2 is a front view of the airplane, this view showing the wing members in folded position by use of dotted lines.

Fig. 3 is an enlarged fragmentary plan view of the area enclosed by the dotted line 3 of Fig.1.

Fig. 4 is an enlarged fragmentary section taken as indicated by the line 4—4 of Fig. 3.

Fig. 5 is an enlarged fragmentary section taken as indicated by the line 5—5 of Fig. 3.

Fig. 6 is an enlarged fragmentary section taken as indicated by the line 6—6 of Fig. 3, this section showing an end view of the locking means for the wing member.

Fig. 7 is a sectional view indicated as 7—7 in Fig. 6, but being drawn to smaller scale than Fig. 6 and showing the locking means in elevation.

Fig. 8 is an enlarged sectional view taken as indicated by the line 8—8 of Fig. 7 and showing details of construction of the locking means.

Fig. 9 is a diagrammatic elevational view indicating the airplane fuselage and a wing structure extending therefrom, with the cables for the wing locking mechanism and the operating means therefor in their respective positions.

Fig. 10 is a diagrammatic plan view corresponding to Fig. 9, showing the position of the cable operating means and the positions of the cables.

Fig. 11 is an enlarged face view of the cable operating means.

Fig. 12 is a cross-section taken on a plane indicated by the line 12—12 of Fig. 11.

Fig. 13 is a partly sectioned plan view of a ratchet valve.

Fig. 14 is a diagrammatic plan of the hydraulic control system employed in conjunction with the devices for moving the wing members, this view showing one of the ratchet valves cross-sectioned as indicated by the line 14—14 of Fig. 13.

Fig. 15 is a diagram representing optimum dimensions in the wing moving means.

As shown in Figs. 1 and 2, the preferred embodiment of our invention is disclosed in a monoplane 20 having a fuselage or body 21 from which internally braced wings 22 extend. Each wing 22 is divided along a line a—a into an inner wing part or member 23 and an outer wing part or member 24. The lines a—a extend lengthwise with respect to the monoplane 20; that is, they extend from the front and toward the rear. These lines a—a are lateral or cross-wise with respect to the wings 22 and extend essentially parallel to the upper and lower faces of the wings. The inner wing parts 23 serve as supports for the outer wing members 24, and hinge means 25 are provided between the members 23 and 24 so that the outer wing members 24 may swing around the axes represented by the lines a—a into folded positions indicated by dotted or broken lines 26 wherein the outer wing members 24 are retracted and lie above and adjacent the supporting structure represented by the inner wing parts 23 and the body 21. When the outer wing members 24 are in retracted position, as shown in the dotted lines 26, the overall spread of the airplane is reduced fifty percent as compared with the wing spread when the outer wing members are in extended or flight position, as shown in Figs. 1 and 2 in full lines.

In Fig. 9 we have diagrammatically shown an inner wing part or supporting structure 23 secured to the body 21 at 27. The inner wing part 23 is of internally braced type, and at the rightward or outer end thereof a hinged pivot 28 is shown which forms part of the hinge means 25. This hinge pivot 28 is substantially aligned with the upper face of the inner wing part 23, and to it the outer wing member 24 is pivotally connected by means of a bracket 29. The invention includes a wing moving means 30 which in its preferred embodiment is constructed as follows: At the outer end of the inner wing part 23 below the hinge pivot 28 is a stationary pivot 31, and carried by the outer wing member 24 is a movable pivot 32 disposed in eccentric relation to the hinge pivot 28 and in a horizontal plane which passes between the pivots 28 and 31. A fulcrum member 33 is provided which is contained entirely within the wing 22 when the outer wing member 24 is in extended or flight position. The outer end 34 of this fulcrum member is connected to the movable pivot 32, and a pivot 35 intermediate the ends of the fulcrum member 33 is connected to the stationary pivot 31 through a link 36 which serves as a guide for the movement of the fulcrum member 33. The inner end 37 of the fulcrum member 33 is pivotally connected to a connecting rod or piston rod 38 which projects from a cylinder-piston device 39 which is swingably supported on a pivot 41 carried by a bracket 42 secured within the inner wing part 23. The cylinder-piston or hydraulic device 39 is of double-acting character; that is, it has fluid chambers at the opposite ends thereof, and when a pressure fluid is fed in through a conduit 43 the piston rod 38 will move rightwardly, and when a pressure fluid is fed in through a conduit 44 the piston rod 38 will be moved leftwardly. The conduits 43 and 44 serve respectively as feed and return conduits, or vice versa depending upon the direction the piston of the hydraulic device is to be moved.

In Fig. 6 the wing operating means 30 is shown in retracted position by full lines, and as previously described it is contained entirely within the wing 22 when the outer wing member 24 is in extended position. When the piston rod 38 is moved rightwardly from its retracted position shown at 45, a force will be exerted to move the fulcrum member 33 rightwardly so that this member will tend to rotate in anti-clockwise direction on its intermediate pivot 35, and likewise a force will be exerted tending to swing the link 36 in anti-clockwise direction, the result being that the fulcrum member will exert against the movable pivot 32 of the outer wing member 24 a force which will carry the movable pivot 32 in anti-clockwise direction around the hinge pivot 28 and along an arcuate path 46 to a position indicated by dotted lines 32a, thereby rotating the outer wing member 24 from its extended position shown in full lines to its retracted position indicated by broken lines 26, wherein the wing member 24 will lie in the position shown at 26 in Figs. 1 and 2. The linkage connection between the piston rod 38 through the fulcrum member 33 and the link 36 is such that the force of the hydraulic device 39 will produce maximum rotative force to move the wing member 24 when such wing member 24 is in positions requiring greatest force to rotate the same around the hinge pivot 28; that is, maximum rotative force will be exerted against the movable pivot 32 of the wing member 24 when the wing member 24 is extending laterally as shown in full lines or when the wing member is in its folded position indicated at 26.

The intermediate pivot 35 of the fulcrum member 33 moves through an arcuate path 47 around the stationary pivot 31 to the position indicated by dotted lines 35a. The pivot 48 at the inner end 37 of the fulcrum member 33, by which the piston rod 38 is connected to the fulcrum member 33, travels through a path 49 which is not an arc of a circle but is controlled by the movement of the pivots 32 and 35 relative to the pivots 28 and 31 as the fulcrum member 33 swings from the position in which it is shown in full lines in Fig. 6 to its dotted line position 33a. As shown in Fig. 15, the pivots 28, 31, 32, 35, and 48 define three triangles X, Y, and Z. The triangle X has sides A, B, and F; the triangle Y has sides F, C, and E; and the triangle Z has sides C, D, and G. It will be noted that the side F is common to the triangles X and Y, and that the side C is common to the triangles Y and Z. The sides of the triangles X, Y, and Z represent the distances between the pivots enumerated. We have found that the path of movement 49 of the pivot 48 may be maintained substantially smooth and that the hereinbefore described mechanical advantage may be obtained when the proportions of the dimensions are substantially as follows: A=2$\frac{13}{32}$ inches; B=4$\frac{11}{32}$ inches; C=6$\frac{1}{8}$ inches; D=10$\frac{5}{32}$ inches; E=6$\frac{1}{16}$ inches; F=4$\frac{3}{16}$ inches; and G=14¼ inches. We have found that if the dimensions above given are maintained within ½ inch plus or minus the values stated, the hereinbefore expressed characteristics, action, and advantages will be maintained.

The hinge pivot 28 and the stationary pivot 31 are carried by a bracket 51 which is secured in or to the end of the inner wing part 23 in any acceptable manner. The hinge 25 includes, in addition to the hinge pivot 28, a hinge pivot 52 shown in Figs. 3, 4, and 5. This hinge pivot 52 is carried by a bracket 53 which is also secured in the outer end of the inner wing part 23. The outer wing member 24 is connected to the hinge pivot 52 by means of a bracket 54. The fulcrum member 33 is of the characteristic present form shown, and the inner or lower end 37 thereof is adapted to pass through an opening 55 formed at the inner edge of the front wing stay 56. Each front hinge pivot 58, as shown in Figs. 3 and 6, is covered by a flexible member 57, the end of which is secured to the upper end of the inner wing part 23 by suitable means, such as rivets 59. The outer edge 61 of the flexible cover member 57 is connected by means of rivets 62 to a swinging cover plate 63 which is upwardly arched and is secured to the outer wing member 24 by rivets 64. This arched plate 63 swings from the position in which it is shown in full lines in Fig. 6 to the dotted line position 63a, and a notch 65 is cut therein, as indicated in Fig. 3, so that as the member 63 swings into the dotted line position 63a, it will clear the bracket 51. When the outer wing member 24 is in folded position, as indicated at 26 in Fig. 6, the flexible cover member 57 folds into the dotted line position indicated at 57a. When the outer wing member 24 is in extended or flight position, however, the flexible cover or sealing member 57 is stretched tightly down over the arched plate 63.

Each rearward hinge pivot 52 is provided with a flexible cover member 67 the outward edge 68 of which is connected by means of rivets 69 to the upper face of the outer wing section 24. The inner edge 71 of the cover member 67 is connected by means of rivets 72 to an arched, stream-lined plate 73 which in turn is riveted to the upper face of the inner wing part 23. When the outer wing member 24 is raised into folded position as indicated by broken lines 26 in Fig. 4, the flexible member 67 folds back into the position indicated at 67a in Figs. 4 and 5. When the outer wing member 24 is in extended position, the flexible cover member 67 assumes the rounded position covering the hinge pivot 52, as shown in Fig. 5.

By reference to Fig. 7 it will be noted that the wing 22 is arched or upwardly curved at 73, between the hinge pivots 28 and 52. To enable the swinging of the outer wing member from extended position to retracted position without the necessity of elevating the hinge axis defined by the hinge pivots 28 and 52, the outer upper edge of the inner wing part 23 is notched inwardly to provide a notch 74 between the hinge pivots 28 and 52, as best shown in Fig. 3. The upper surface wall 75 of the outer wing member is provided with a projection or tongue 76 corresponding in shape to the notch 74, this projection forming a flap which closes the notch 74, as shown in Figs. 3 and 5, when the outer wing member 24 is in extended position. The area of the projection or flap 76 is slightly greater than the area of the notch 74 so that the edges 77 and 78 thereof will extend under the edges 79 and 80 of the notch 74. When the outer wing member 24 is swung upwardly from extended position to its folded position, the flap 76 swings downwardly in a recess 82 provided therefor in the outer end of the inner wing part 23. This recess 82 is formed by sloping the end stay plate 83 rearwardly as indicated by dotted lines in Fig. 6 and by full lines in Fig. 5.

Locking means 85, as best shown in Figs. 7 and 8, are provided for locking the outer wing member 24 securely in extended position. This locking means includes a clevis 86 formed by a pair of outstanding lugs 87 and 87a connected to the inner wing part 23 near the lower face thereof, and a clevis 88 formed by lugs 89 and 89a which are connected to the outer end of the inner wing part 23 in a position below the hinge pivot 52 and adjacent the lower face of the inner wing part 23. The outer wing member 24 is equipped with a pair of tongues 91 and 92 which are respectively adapted to engage the clevises 86 and 88 when the outer wing member 24 is in extended position as shown in Figs. 2 and 6. The lugs 87, 87a, 89, and 89a, and the tongues 91 and 92 have cooperating openings 93 which come into positions of alignment when the outer wing member 24 is moved into extended position so that locking pins 94 and 95 may be passed through the cooperating openings 93 so as to lock the clevises 86 and 88 to the tongues 91 and 92.

As shown in Fig. 8, the pin member 94 is carried in a guide sleeve 96 which is secured by threads 97 to the lugs 87, and is also secured to a bracket 98 by threaded connection at 99 with a sleeve 101 projecting from the bracket 98. The pin 95 is guided in a sleeve 102 which projects from the lug 89 toward a bracket 103 which is spaced from the bracket 98. Both the brackets 98 and 103 are secured by screws 105 to a vertical plate 104. Between the brackets 98 and 103 a cable drum 106 is supported by means of sleeves 107 and 108 which project axially into openings 109 and 111 provided therefor in the brackets 98 and 103. The sleeve 107 has a right-hand internal thread 112, and the sleeve 108 has a left-hand internal thread 113. A tubular member 114 extends rightwardly from the pin 94 and has a right-hand thread 115 thereon engaging the thread 112 of the sleeve 107. A tubular screw 116 having a left-hand thread 117 thereon projects into the sleeve 108, and from the inner end of the member 116 a tubular guide 118 is projected into the tubular member 114. To prevent rotation of the members 114 and 116, they are provided with key-ways 119 which are engaged by keys 121 secured to the brackets 98 and 103 by use of screws 122. The pin 95 is connected to the screw member 116 by means of a bar 123 having a flexible joint 124 on one end thereof whereby it connects to the screw 116 and a flexible joint 125 on the other end thereof whereby it connects to the pin 95. For the purpose of length adjustment, the bar 123 has a screw 126 threaded in the end thereof, as shown in Fig. 8, this screw 126 being provided with a lock nut 127 and serving to connect the flexible joint 125 to the end of the bar 123.

To produce rotation of the sleeves 107 and 108 so as to extend the pins 94 and 95 into the positions in which they are shown in Fig. 7, or to retract them into the positions in which they are shown in Fig. 8, a cable 128 is wound upon the drum 106. This cable 128, as shown in Fig. 8, is passed through openings 129 and 131 in the drum 106 so that the intermediate portion 132 of the cable will extend inside the drum, and the external portions of the cable 128 are given several turns around the surface of the drum and are then carried from the drum so as to provide a pair of separate cable ends or members 133 and 134 which may be led through the inner wing member 23 to the body 21 of the airplane and preferably into the cockpit thereof, so that a person in the cockpit may move the cable members 133 and 134 and thereby produce rotation of the drum 106 and consequently extension or retraction of the locking pins 94 and 95.

As shown in Figs. 7, 9, and 10, the cable members 133 and 134 are carried from the drum 106 around pulleys 135 set diagonally within the inner wing part 23 near the outer end thereof, to pulleys 136 disposed within the wing near the front edge or nose 137 thereof. These cable members 133 and 134 are then carried inwardly within the wing to pulleys 138 over which they are led into the cockpit 139 in the body 21 of the airplane. The cable members 133 and 134 are then carried over pulleys 141, and through a guide 142 to a cable actuating or operating device 143.

It will be understood that the wing locking means, shown in Figs. 7, 8, 9, and 10 as being in the right-hand inner wing part 23 of the airplane, are duplicated in the left-hand wing part 23; therefore, we have shown in Figs. 9 and 10 a pair of cable members 133a and 134a extending leftwardly from the operating device 143 and over guide pulleys 144, 145, and 146 so as to be led into the left-hand inner wing part 23. Accordingly, the operation of the operating means 143 will simultaneously move the cable members 133, 134, 133a, and 134a so as to simultaneously operate the locking means in right-hand and left-hand wings of the airplane, either to disengage or engage such locking means, as may be desired.

As shown in Figs. 11 and 12, the cable operating means 143 includes a supporting frame 147 having a base 148 whereby it may be secured to a wall 149 within the airplane, a cylindrical wall 151, and a front cover plate 152 bolted to the front end of the wall 151. Within the supporting structure 147, a pair of drums 153 and 154 are supported by means of bearings 155 on a shaft 156 which is in turn supported by bearings 157 and 158 carried respectively by the members 148 and 152. Fixed to the shaft 156, between the drum members 153 and 154, is a rotatable member 159 carrying a bevel gear 161 on a radial axis and in such position that it will engage bevel gears 162 and 163 which are secured to the drum members 153 and 154 in facing relation. When the shaft 156 is rotated so as to rotate the member 159, the gear 161 will impart rotational force to the gears 162 and 163 tending to rotate the drum members 153 and 154 in the direction of rotation of the shaft 156; but, this differential gear mechanism will cause rotation of either of the drum members 153 and 154 should the other drum member be held stationary.

For rotating the shaft 156, we key a gear 164 on the forward end thereof and place a pinion 165 in a position to engage the gear 164. The pinion 165 is mounted on a shaft 166 carried in bearings 167 and 168 supported respectively in the member 152 and in a member 169 which is of circular form and is secured to bracket means 171 formed on the member 152. An operating lever 172 is secured to the outer end of the shaft 166, and a handle 173 is mounted in the outer end of the lever 172. This handle 173 is slidably mounted on a sleeve 174 and is connected to a locking pin 175 which extends through the sleeve 174 into engagement with one of a number of openings 176 in an annular plate 177 which is secured to the peripheral portion of the plate member 169. When it is desired to turn the lever 172 so as to actuate the cable operating device 143, the handle 173 is pulled outwardly so as to move the pin 175 against the force of a spring 178 and out of engagement with a hole 176 in the ring 177.

The cable members 133 and 134 are carried through suitable slots in the cylindrical wall 151 of the cable operating device 143 and are wound in opposite directions on the drum member 153. The cable members 133a and 134a are in a like manner connected to the drum member 154, the cable members being connected to the drum members 153 and 154 in such a manner that when the device 143 is operated so as to move the cable member 133 toward or into the device 143, the cable 133a will be likewise moved toward or into the device 143. The operation of the cable operating device 143 will be understood from the following. To move the locking pins 94 and 95 of both locking devices of the airplane from "locked" position, as indicated in Fig. 7, the drum 106 must be rotated in the direction which is accomplished by unwinding the cable member 133 therefrom and winding the cable member 134 thereon. Accordingly, to withdraw the pins 94 and 95 in both wing structures, it is necessary that the shaft 156 be rotated in clockwise direction so as to exert a tension or pull in the cable members 133 and 133a, Fig. 11. The clockwise rotation of the shaft 156 is obtained by an anti-clockwise rotation of the handle 173 around the shaft 166. The clockwise rotation of the shaft 156 is transmitted through the gear 161 to both gears 162 and 163 associated with the drum members 153 and 154, and unless the resistances to which the cable members 133, 134, 133a, and 134a are subjected are equally balanced, one of the drum members 153 or 154 will be caused to rotate in clockwise direction due to the force transmitted through the gears 161 and 162, and this clockwise rotation of the drum member 153 will most likely continue until the cable 133 is stopped as the result of the pins 94 and 95 being completely retracted into the positions in which they are shown in Fig. 8. Then, since the drum member 153 cannot move the rotational force applied through the gear 161 will cause rotation of the gear member 163 and the drum member 154, which rotation of the drum member 154 will continue until the locking pins 94 and 95 in the left-hand wing structure of the airplane are entirely retracted. When all of the pins 94 and 95 are completely retracted, the tension in the cable members 133 and 133a will be balanced as the result of the operation of the differential gear mechanism. For the purpose of showing whether the drum members 153 and 154 are in locked or unlocked position, an indicator 180, Fig. 12, is provided, this indicator consisting of a plate 181 placed so as to rotate around the shaft 166. This plate 181 has gear teeth 183 cut in the periphery thereof for engagement with a small gear 184 mounted on the forward end of the shaft 156. A ring 185 is secured to the plate 181 so that it will pass across an opening 186 in the member 169. Suitable indicia are placed on the ring 185, such, for example, as the words "locked" and "unlocked". In Fig. 11 the indicia "locked" is displayed through the opening 186 to indicate that at this time the pins 94 and 95 should be in locked position, or, in other words, as shown in Fig. 7. As a positive check for the indicating means 180 of the cable operating device, an indicating means 190 is placed in each wing of the airplane and is so constructed that it will be actuated by a pin, such as the pin 94, having been moved into locked position. The indicating means 190 consists of a plate or target 191 with the upper portion thereof disposed in a slot 192 in the inner wing part 23. The member 191 is secured to the upper end of a substantially vertical bar 193 having a slot 194 near its lower end for engaging a guide pin 195. A bell crank 196 is swung on a pivot 197, and one end thereof is pivotally connected at 198 to the lower end of the bar 193. A bar 199 is slidably mounted on pins 201 in such position that the rear end 202 thereof will be engaged as the locking pin 94 moves into completely locked position, the bar 199 being thereby moved forwardly, or to the left in Fig. 7, this movement of the bar 199 being transmitted to the lower end of the bell crank 196 through use of a pin 204 in the end of the bar 199 and slidable in a slot 205 formed in the bell crank 196. The swinging of the bell crank 196 as the result of the movement of the bar 199 by the locking pin 94 will pull the bar 193 and the target 191 downwardly into the retracted position in which it is shown in Fig. 7. A spring 206 is connected to the bar 193 in a manner to exert a force tending to raise the bar 193 and the target 191; therefore, when the locking pin 94 is not in its completely locked position, as shown in Fig. 7, the target 191 will be raised above the position in which it is shown, and being visible from the cockpit of the airplane will indicate to the pilot the state of the locking device associated therewith. Accordingly, after the pilot has operated the cable operating device 143, he will look out along each wing to note the positions of the indicator targets 191 of each of the locking devices, of which there are two in an aerial vehicle having a pair of folding wings of the character hereinbefore described.

In Fig. 14 we diagrammatically show a complete embodiment of our hydraulic wing operating means. In each of the wings 22 of the airplane there is a wing moving means 30, each with an associated cylinder-piston device 39 with conduits 43 and 44 connected thereto. Each pair of conduits 43 and 44 is connected to a shuttle check valve 207. These shuttle valves 207 are preferably placed in the inner wing parts 23 close to the cylinder-piston mechanisms 39. The source of fluid under pressure may be located anywhere in the airplane, but ordinarily it is in the body 21 and may consist of an oil pump 208 which pumps oil from a reservoir 209 into a pressure oil delivery pipe 211. The pipe 211 may be connected through a pressure relief valve 212 with a return oil pipe 213 leading to the reservoir 209. The pressure relief valve 212 defines the maximum pressure of oil which may exist within the delivery pipe 211. For control of the pressure oil, a four-way valve 214 may be provided, this valve having diametrally opposing ports 215 and 216, the port 215 being connected to the pipe 211 and the port 216 being connected through a pipe 210 with the return oil pipe 213. A pipe or conduit 217 extends from a port 218 of the valve 214, and a conduit 220 extends from the remaining port 221 of the valve 214. Each shuttle valve 207 has a primary inlet port 222 which is connected through a conduit 217a with the conduit 217, and a primary outlet port 223 which is connected to a conduit 43 leading to a cylinder-piston device 39. Also, each shuttle valve 207 has a secondary inlet port 224 connected through a conduit 220a with the conduit 220, and a secondary outlet port 225 which connects through a conduit 44 with a cooperating hydraulic cylinder-piston device 39.

When the four-way valve 214 is operated so as to deliver pressure oil to either the conduit 217 or the conduit 220, both of the shuttle valves 207 and both of the cylinder-piston mechanisms 39 will be operated in the same manner; therefore, in disclosing the operation of the hydraulic system it is necessary to explain in detail the operation of only one of the shuttle valves 207, such as the right-hand shuttle valve 207 which is shown in section to enlarged scale. The shuttle valve 207, used in duplicate as described, has a body 226 of approximately cylindrical form with a central bore 227 and counterbores 228 and 229 at the opposite ends thereof. The counterbore 228 has an intermediate annular channel 231 connecting to the primary inlet port 222, and the counterbore 229 has an intermediate annular channel 232 connected to the secondary inlet port 224. The primary outlet port 223 connects to the inner end of the counterbore 228, and the secondary outlet port 225 connects to the inner end of the counterbore 229. A plug 233 threads into the outer portion of the counterbore 228, and its inner edge 234 serves as an abutment for a sealing ring 235 and positions the sealing ring in a plane intermediate the channel 231 and the primary outlet port 223. A plug 233 is threaded into the outer portion of the counterbore 229, and its inner edge 234 serves as an abutment for positioning a sealing ring 237 in a plane between the channel 232 and the secondary outlet port 225. Springs 238 are employed as shown to hold the sealing rings 235 and 237 against the abutments 234 by which they are positioned as previously described. A valve piston 240 is positioned within the bore 227, and means 241 are provided for holding the piston 240 in an intermediate position when the pressures against the ends thereof are balanced. This positioning means 241 in each instance comprises a stud 242 projecting inwardly from a plug 233, a plate 243 slidable on the stud and being urged toward a stop nut 244 on the inner end of the stud 242 by a spring 245. The plates 243 are adapted to bear against shoulders 246 of the piston 240, and the stop shoulders 247 of the nuts 244 are spaced apart a distance substantially equal to the space between the shoulders 246. Accordingly, when both plates 243 are in engagement with their cooperating stop nuts 244, the piston 240 will be held in an intermediate position in the bore 227. The piston 240 has an intermediate section 248 carrying sealing means 249 in engagement with the bore 227, and upon opposite sides of the intermediate section annular channels 250 and 251 are provided to form control ports. The extreme ends of the piston 240 consist of cylindrical walls 252 and 253 which respectively lie within the sealing means 235 and 237 when the piston is in an intermediate position, but when the piston 240 is moved one way or the other from its intermediate position, the end wall 252 or the end wall 253 will move beyond its cooperating sealing means 235 or 237, and fluid may then flow through a channel 250 or 251. For example, when the four-way valve 214 is in the position shown in Fig. 14, fluid under pressure will pass through a conduit 217a into the primary inlet port 222. The pressure of the oil now introduced through the port 222 will force the piston 240 rightwardly into the position in which it is shown, thereby moving the channel 251 into such position that it will connect the port 225 with the port 224. When the channel 251 is so positioned, the oil from the right-hand end of the right-hand hydraulic piston device 39 may flow through the conduit 44 and then what we shall term "reverse direction" from the port 225 to the port 224, into the conduit 220a which is connected to the port 221 of the valve 214, with the result that the oil will be discharged through the port 216 of the valve 214 into the fluid return pipe 213 which connects with the reservoir 209.

The sealing rings 235 and 237 are so formed as to serve as check valves to prevent flow of oil in reverse direction from the port 223 to the port 222, and from the port 225 to the port 224, when the cylindrical end walls 252 and 253 are respectively in engagement with the sealing rings 235 and 237. The sealing rings 235 and 237 may be made of a synthetic rubber material and are of U-shaped cross-section, with the leg or flange portions thereof faced inwardly so that when the walls 252 and 253 are respectively in engagement with these sealing rings 235 and 237, pressure exerted through the ports 223 and 225 will expand the ring members 235 and 237 and form a tight seal which will prevent passage of fluid from the port 223 to the port 222, or from the port 225 to the port 224.

The piston 240 is shown in the position which it assumes when the right-hand outer wing member 24 is being moved from extended position to retracted position. Oil under pressure enters through the port 222, and the pressure thereof has moved the piston 240 into rightward position. The pressure oil may pass from the port 222 rightwardly along the upper and lower faces, or inner and outer faces, of the sealing ring 235 to the port 223. From the port 223 the pressure oil passes through the conduit 43 into the leftward end of the hydraulic device 39, with the result that the piston rod thereof is forced in rightward direction, causing the wing moving means 30 to be rotated in anti-clockwise direction to carry the wing associated therewith toward retracted position. Should an external pressure be applied, such for example as a strong wind striking the partly raised outer wing member, so as to produce a back pressure in the direction of the arrow 255 sufficient to cause a reverse flow of oil through the conduit 43 into the port 223 and toward the port 222, the sealing ring 235 will be expanded, thus preventing a reverse flow of oil. On the other hand, should an external pressure be exerted moving the wing in the direction in which it is being moved by the feeding of pressure oil into the leftward end of the hydraulic device 39, so that this force will tend to move the piston rod 38 in the direction of the arrow 256, faster than such piston rod is being moved by the oil, the following action will result. A slight rightward movement of the piston 257 of the device 39 will cause a reduction in pressure in the leftward chamber 258, which reduction in pressure will be immediately transmitted through the conduit 43, the port 223 and past the sealing ring 235 to the space at the leftward end of the piston 240. At the same time, the increase in pressure in the rightward chamber 259 of the device 39 will be transmitted through the conduit 44 and the port 225 into the rightward end of the shuttle valve 207, thereby tending to balance the fluid pressures on the opposite ends of the piston 240 so that the rightward spring 245, and whatever excess fluid pressure may exist in the rightward end of the device 207, may force the piston 240 into an intermediate position wherein the rightward end wall 253 will lie within the sealing ring 237. Then, the pressure of oil from the rightward chamber 259 of the device 39 will act through the conduit 44 and the port 225 to expand the sealing ring 237 which will act as a check valve and prevent flow of oil from the passage 225 to the port 224, with the result that rightward movement, or movement in the direction of the arrow 256, will be positively prevented. Accordingly, the action of the shuttle valve 207 operates as a restraining means prevents uncontrolled movement of the wing member associated therewith by forces exerted against the wing member, externally or independently of the hydraulic equipment.

The pressure of the fluid applied through the conduit 43 produces against the piston 257, Fig. 14, a force to lift the right-hand wing 24 from extended position to a substantially vertical position wherein its center of gravity will lie in a vertical plane passing through its hinge means 25; but, as soon as the center of gravity of this wing 24 passes beyond this vertical plane, the wing member 24 will tend to swing by gravity toward the reclining or bolted position indicated by dotted lines 26 in Fig. 2. At this time the pressure of fluid in the rightward chamber 259, Fig. 14, under control through the conduit 44 and by the associated shuttle valve 207, will prevent an uncontrolled movement of the wing member 24 from upright position to the reclining position shown in dotted lines 26, Fig. 2.

After the wings have been retracted in the manner above described, they may be again extended to flight position by operating the four-way valve 214 so that the conduit members 220 and 220a will be connected to the pressure pipe 211 and the conduit members 217 and 217a will be connected to the fluid return pipe 213. The pressure fluid for producing movement of the wings will then enter the shuttle valves 207 through the conduits 220a, and the pistons 240 in these devices will be moved in the opposite direction from that in which they were moved during the operation of retracting the outer wing members. For example, the piston 240 of the rightward shuttle valve 207 will be moved by the pressure of oil entering through the port 224 into a leftward position wherein the annular channel 250 of the piston 240 will lie opposite the sealing ring 235 and form a fluid by-pass from the port 223 to the port 222. At this time, that is, with the piston 240 moved leftwardly, the sealing ring 237 will prevent movement of the piston rod 38 and the wing moving means 30 in the direction indicated by the arrow 256, and the external application of pressure to the outer wing member tending to move the wing moving means 30 and the piston rod 38 in the direction of the arrow 255 will produce an increase in pressure in the leftward chamber 258 of the device 39, which pressure increase will be transmitted through the conduit 43 and the port 223 into the leftward end of the rightward shuttle valve 207, and the pressure will be reduced in the rightward end of the shuttle valve 207, with the result that the piston 240 will be moved into an intermediate position and the sealing ring 235 will then prevent passage of oil from the leftward chamber 258 of the device 39. Accordingly, the shuttle valve 207 prevents uncontrolled movement of the associated outer wing member 24 by external application of pressure at all times regardless of whether the outer wing member is being retracted, extended, or held stationary. The pressure of fluid which enters the rightward chamber 259 through the conduit 44 will provide a force to swing the wing member 24 from retracted position to and through upright position. Thereafter the wing member 24 will tend to swing by gravity down to extended position, and during this time the pressure of fluid in the leftward chamber 258, under control of the shuttle valve 207, will prevent uncontrolled movement of the wing member 24 by the force of gravity or any external force applied thereto.

As shown in Fig. 13, pressure release valves 260 and 261 are built into the shuttle valve 207 to protect against injury to the shuttle valve, the conduits 43 and 44, and the associated cylinder-piston mechanism 39, as the result of excess fluid pressure resulting from any cause. These pressure release valves 260 and 261 protect also the conduits 217a and 220a against injury resulting from the expansion of oil in the entire system below or beyond the control valve 214 when such control valve is in an intermediate position. The pressure release valves 260 and 261 are formed in passages 262 and 263 which connect the ports 223 and 225 with an outlet opening 264 which is adapted to be connected by means of a conduit 265 with the fluid return pipe 213. Each passage 262 and 263 has a seat 266 in which a valve member, such as a ball 267, is held by the pressure of a spring 268 which transmit their pressure through guides 269 to the balls 267. The outer ends of the passages 262 and 263 are closed, and the springs 268 are compressed, by plugs 270.

We claim as our invention:

1. In a winged aerial vehicle, a hinged wing member and operating means for swinging said wing member relative to a wing supporting member, between extended and retracted positions, comprising: a hinge connecting said wing member to said supporting member, said hinge being disposed near one face of said wing member; a stationary pivot member carried by said supporting member in a position adjacent said hinge; a movable pivot member connected to said wing member in eccentric relation to said hinge; a fulcrum member having its outer end connected to said movable pivot member; a link connecting an intermediate part of said fulcrum member to said stationary pivot member; and means for applying a force to said fulcrum member to swing it on said link and swing said link on said stationary pivot member.

2. In a winged aerial vehicle structure of the character described: a wing member connected so as to be moved from extended to retracted position; and hydraulic means carried by the aerial vehicle operative to move said wing member between extended and retracted positions, said hydraulic means having a hydraulic restraining means operative only in response to forces applied externally to said wing for preventing movement of said wing member by forces external to said hydraulic means.

3. In a winged aerial vehicle, a hinged wing member and operating means for swinging said wing member relative to a wing supporting member, between extended and retracted positions, comprising: a hinge connecting said wing member to said supporting member; a movable pivot means on said wing member eccentric of said hinge; a fulcrum member having its outer end connected to said movable pivot means; operating means for applying a force to said fulcrum member for moving same; and guide means cooperating between said fulcrum and said supporting member whereby an intermediate part of said fulcrum member is caused to follow an arcuate path around said hinge.

4. In a winged aerial vehicle, a hinged wing member and operating means for swinging said wing member relative to a wing supporting member, between extended and retracted positions, comprising: a hinge connecting said wing member to said supporting member; a movable pivot means on said wing member eccentric of said hinge; a fulcrum member having its outer end connected to said movable pivot means; operating means for applying a force to said fulcrum member for moving same; and guide means movably connected to said supporting member and said fulcrum member whereby an intermediate part of said fulcrum member is caused to follow an arcuate path around said hinge.

5. In an aerial vehicle, including a wing having an inner stationary wing part and an outer movable wing part, the combination of: a hinge connecting said wing parts together near one face thereof so that said movable wing part may be moved from an extended position in alignment with said stationary wing part into folded position; a movable pivot means on said movable wing part; a fulcrum means having its outer end connected to said movable pivot means; an operating means situated in said stationary wing part and connected to said fulcrum means for moving same; and guide means connected to said fulcrum means whereby, when said fulcrum is moved, it is caused to move in a path around said hinge.

6. In an aerial vehicle, including a wing having an inner stationary wing part and an outer movable wing part, the combination of: a hinge connecting said wing parts together near one face thereof so that said movable wing part may be moved from an extended position in alignment with said stationary wing part into folded position; a fulcrum member; means for connecting one end of said fulcrum member to said movable wing part eccentric of said hinge; an operating means connected to the opposite end of said fulcrum member for moving same; and guide means operatively connected between said stationary wing part and said fulcrum member to guide same in an arcuate path around said hinge when said fulcrum member moves from a position below said hinge to a position above said hinge.

7. In a winged aerial vehicle, a hinged wing member and operating means for swinging said wing member relative to a wing supporting member, between extended and retracted positions, comprising: a hinge connecting said wing member to said supporting member, said hinge being disposed near one face of said wing member; a stationary pivot member carried by said supporting member; a movable pivot member connected to said wing member in eccentric relation to said hinge; a fulcrum member having its outer end connected to said movable pivot member; a link connecting an intermediate part of said fulcrum member to said stationary pivot member; and means for applying a force to said fulcrum member to swing it on said link and swing said link on said stationary pivot member.

8. In an aerial vehicle having a supporting structure and wings foldably connected thereto which have extended and folded positions, the combination of: a pair of lock means, each of which has a locked position in which one of said wings is locked in extended position, and also an unlocked position; a pair of cables, each of which is adapted to operate one of said lock means; a pair of drums, each of which is connected to one of said cables for operating same; and a differential drive means operatively connected to both of said drums, whereby said drums may be simultaneously driven in the same direction or one may be driven independently of the other should one of said lock means reach locked position before the other of said lock means.

9. In a winged aerial vehicle having a supporting structure and a wing mounted thereon and movable between extended and retracted positions, the combination of: a hydraulic operating means operatively connected to said wing to move same, including a cylinder, a piston, and fluid conveying means for delivering fluid under pressure to one side of said piston and for withdrawing fluid from the other side thereof; and means operable in response to an external force applied to said wing, tending to move same, for building up suitable fluid pressure in said hydraulic operating means to resist said external force.

10. In a winged aerial vehicle having a supporting structure and a wing mounted thereon and movable between extended and retracted positions, the combination of: a cylinder; a piston operable in said cylinder and connected to said wing; fluid supply means for supplying fluid under pressure to one side of said piston for moving same in order to move said wing; and means operable when said wing is moved by an external force for causing a fluid pressure to be built up in said cylinder to restrain the movement produced in said piston as a result of said external force moving said wing.

11. In a winged aerial vehicle having a supporting structure and a wing mounted thereon and movable between extended and retracted positions, the combination of: a cylinder; a piston operable in said cylinder and connected to said wing; fluid supply means for supplying fluid under pressure to one side of said piston for moving same in order to move said wing; and means operable when said wing is moved by an external force for causing a fluid pressure to be built up in said cylinder on the high pressure side of said piston to restrain the movement produced in said piston as a result of said external force moving said wing.

12. In a winged aerial vehicle having a supporting structure and a wing mounted thereon and movable between extended and retracted positions, the combination of: a cylinder; a piston operable in said cylinder and connected to said wing; fluid supply means for supplying fluid under pressure to one side of said piston for moving same in order to move said wing; and means operable when said wing is moved by an external force for causing a fluid pressure to be built up in said cylinder on the low pressure side of said piston to restrain the movement produced in said piston as a result of said external force moving said wing.

13. In a winged aerial vehicle having a supporting structure and a wing mounted thereon and movable between extended and retracted positions, the combination of: operating means connected to said wing and being operable to move said wing from extended to retracted positions and vice versa; and restraining means associated with said operating means, said restraining means being normally in inactive position and converting to active condition in response to a movement of said wing caused by an external force, to restrain such movement of said wing.

14. In a winged aerial vehicle having a supporting structure and a wing mounted thereon and movable between extended and retracted positions, the combination of: operating means connected to said wing and being operable to move said wing from extended to retracted positions and vice versa; and restraining means associated with said operating means, said restraining means being normally in inactive position and converting to active condition in response to a movement of said wing caused by an external force, to restrain the movement produced in said operating means by such movement of said wing and thus restrain such movement of said wing.

15. In a winged aerial vehicle having a supporting structure and a wing mounted thereon and movable between extended and retracted positions, the combination of: a hydraulic operating means operatively connected to said wing to move same, including a cylinder, a piston, conduits connected to said cylinder on opposite sides of said piston, and a fluid-pressure source adapted to deliver fluid under pressure to said cylinder through one of said conduits, the fluid on the other side of said piston flowing from said cylinder through the other of said conduits; and means operable in response to an external force applied to said wing, tending to move same, for building up suitable fluid pressure in said hydraulic operating means to resist said external force.

16. In a winged aerial vehicle having a supporting structure and a wing mounted thereon and movable between extended and retracted positions, the combination of: a cylinder; a piston operable in said cylinder and connected to said wing; conduits connected to said cylinder on opposite sides of said piston; a fluid-pressure source connected to one of said conduits; a fluid reservoir connected to the other of said conduits, said fluid-pressure source receiving fluid from said fluid reservoir; and means operable when said wing is moved by an external force for causing a fluid pressure to be built up in said cylinder to restrain the movement produced in said piston as a result of said external force moving said wing.

17. In a winged aerial vehicle having a supporting structure and a wing mounted thereon and movable between extended and retracted positions, the combination of: a cylinder; a piston operable in said cylinder and connected to said wing; conduits connected to said cylinder on opposite sides of said piston; a fluid-pressure source connected to one of said conduits; a fluid reservoir connected to the other of said conduits, said fluid-pressure source receiving fluid from said fluid reservoir; and means operable when said wing is moved by an external force for causing a fluid pressure to be built up in said cylinder on the high pressure side of said piston to restrain the movement produced in said piston as a result of said external force moving said wing.

18. In a winged aerial vehicle having a supporting structure and a wing mounted thereon and movable between extended and retracted positions, the combination of: a cylinder; a piston operable in said cylinder and connected to said wing; conduits connected to said cylinder on opposite sides of said piston; a fluid-pressure source connected to one of said conduits; a fluid reservoir connected to the other of said conduits, said fluid-pressure source receiving fluid from said fluid reservoir; and means operable when said wing is moved by an external force for causing a fluid pressure to be built up in said cylinder on the low pressure side of said piston to restrain the movement produced in said piston as a result of said external force moving said wing.

19. In an aerial vehicle having a supporting structure and wings pivotally connected thereto, the combination of: lock means for each of said wings adapted to be actuated so as to assume locked or unlocked condition; lock actuating elements extending from said lock means; a member to receive movement to be employed in the actuation of said lock means; and a differential linkage connecting said member to said lock actuating elements to transmit an actuating force from said member to both of said elements and permit movement of one of said elements independently of the other.

20. In a winged aerial vehicle having a supporting structure and a wing mounted thereon and movable between extended and retracted positions, the combination of: operating means connected to said wing and being operable to move said wing from extended to retracted position and vice versa; means for restraining movement of said wing, said restraining means being normally in inactive condition; and means operating in response to a movement of said wing by an external force to render said restraining means active so that it will restrain movement of said wing.

21. In an aerial vehicle having a wing member swingable upward on a non-vertical axis from an extended position through an upright position to a sloping position on the opposite side of said upright position: power means controllable to apply a force to lift said wing member from one of said positions to said upright position against the force of gravity and to apply a supporting force to said wing member to control its movement downward under the force of gravity from said upright position to the other of said positions.

22. In an aerial vehicle having a wing member swingable on a non-vertical axis from an extended position through a vertical position to a sloping position on the opposite side of said vertical position: power means controllable to apply a force to lift said wing member to cause it to swing up against the force of gravity from one of said positions to another of said positions and to apply a supporting force to said wing member to control its movement during the time it swings downward under the force of gravity from one to another of said positions.

23. In an aerial vehicle having a wing member movable from operative to inoperative position, means for moving said wing member from one of said positions to the other, comprising: a fluid motor; means for connecting said fluid motor to said wing member; conduit means connected to said motor; a pump connected to said conduit means to feed a fluid thereto under pressure; a bypass connecting the outlet of said pump with the inlet thereof, there being a pressure relief valve in said bypass; a control valve in said conduit means between said bypass and said motor; and means operating to prevent a reversal flow of fluid to said control valve.

24. In an aerial vehicle having a wing member movable from operative to inoperative position, means for moving said wing member from one of said positions to the other, comprising: a fluid motor; means for connecting said fluid motor to said wing member; conduit means connected to said motor; a pump connected to said conduit means to feed a fluid thereto under pressure; a bypass connecting the outlet of said pump with the inlet thereof, there being a pressure relief valve in said bypass; a control valve in said conduit means between said bypass and said motor; means operating to prevent a reversal flow of fluid to said control valve; a return line for conducting fluid from said motor to said inlet of said pump; and restraining means operative to prevent an excess flow of fluid through said return line in consequence of force externally applied to said wing member.

25. An airplane folding wing system including: an insertable and retractable pin locking the wing in extended position; an indicator normally disengaged from said pin; and means transmitting movement from said pin to said indicator.

26. An airplane folding wing system including: a hinge connecting the wing to the airplane structure in laterally foldable and extendible relation, the hinge comprising a strap and a plurality of pivotally articulated members, the members being recessed into the wing and structure, and the strap overlying the recess in sealing relation while the wing is extended.

27. An airplane folding wing system including: a hinge connecting the wing to the airplane structure in laterally foldable and extendible relation, the hinge comprising a strap and a plurality of pivotally jointed members, the jointed members being recessed into the wing and structure, and the strap sealing the recess as well as fairing the joint to the adjacent surfaces while the wing is extended.

28. In a hydraulic operating system for use in moving a folding airplane wing, or the like, the combination of: a source of fluid under pressure; a fluid motor having connection with the part to be moved; a pair of conduits connecting said motor with said source of fluid, one of said conduits serving as a feed conduit and the other of said conduits serving as a return conduit; valve means in said feed conduit to control the flow of fluid therein at least toward said source of fluid; valve means in said return conduit to control the flow of fluid therein at least in the direction away from said motor; a bypass around said last named valve means; and means operative in response to external pressure applied to said parts to be moved to close said bypass.

29. In a hydraulic operating system for use in moving a folding airplane wing, or the like, the combination of: a source of fluid under pressure; a fluid motor having connection with the part to be moved; a pair of conduits connecting said motor with said source of fluid, one of said conduits serving as a feed conduit and the other of said conduits serving as a return conduit; valve means in said feed conduit to control the flow of fluid therein at least toward said source of fluid; valve means in said return conduit to control the flow of fluid therein at least in the direction away from said motor; a bypass around said last named valve means; and control means for opening and closing said bypass, said control means comprising an element having a face exposed to the pressure of fluid in one of said conduits and a face exposed to the pressure of fluid in the other of said conduits so as to be moved in alternate directions in response to changes in relative pressures in said conduits and to thereby open and close said bypass.

30. In a hydraulic operating system for use in moving a folding airplane wing, or the like, the combination of: a reversible fluid motor connected to the part to be moved; a first conduit and a second conduit extending from said motor, there being means for selectively connecting said conduits to a source of fluid pressure so that either one of said conduits will serve as a feed line and the other will serve as a return line for the fluid; flow control means in each of said conduits; a pair of bypass means, one each of which is associated with one each of said flow control means to bypass the same; and control means for said bypass means operative in response to changes in relative pressures in said conduits to open one of said bypass means while the other is closed, and vice versa.

31. In a hydraulic operating system for use in moving a folding airplane wing, or the like, the combination of: a reversible fluid motor connected to the part to be moved; a first conduit and a second conduit extending from said motor, there being means for selectively connecting said conduits to a source of fluid pressure so that either one of said conduits will serve as a feed line and the other will serve as a return line for the fluid; flow control means in each of said conduits; a pair of bypass means, one each of which is associated with one each of said flow control means to bypass the same; and control means for said bypass means comprising a member subjected to the pressure of fluid in said conduits so as to be actuated when there is a superior pressure in either of said conduits to open the bypass associated with the flow control means in the other of said conduits.

32. In a hydraulic operating system for use in moving a part of a folding wing structure, or the like, having a reversible fluid motor connected to the part to be moved and a pair of conduits extended from said motor, there being means for selectively connecting either of said conduits to a source of fluid pressure so that either one of said conduits will serve as a feed line while the other serves as a return line for the motivating fluid: a pair of flow controlling means to be connected one each into one each of said conduits; a pair of bypass means, one each of which is associated with one each of said flow controlling means to bypass the same; and control means for said bypass means comprising a member subjected to the pressure of fluid in said conduits so as to be actuated when there is a superior pressure in either of said conduits to open the bypass associated with the flow controlling means in the other of said conduits.

33. In a hydraulic operating system for use in moving a part of a folding wing structure, or the like, having a reversible fluid motor connected to the part to be moved and a pair of conduits extended from said motor, there being means for selectively connecting either of said conduits to a source of fluid pressure so that either one of said conduits will serve as a feed line while the other serves as a return line for the motivating fluid: a control valve body having a pair of passages to be connected one each to one each of said conduits; a check valve in each of said passages to prevent a flow of fluid away from said motor; and a member in said body movable back and forth in response to the changes in the relative pressures of fluid in said conduits, said member having means which in the intermediate position thereof renders both of said check valves operative and the alternate extreme positions thereof render either one or the other of said check valves inoperative.

34. In a hydraulic operating system for use in moving a part of a folding wing structure, or the like, having a reversible fluid motor connected to the part to be moved and a pair of conduits extended from said motor, there being means for selectively connecting either of said conduits to a source of fluid pressure so that either one of said conduits will serve as a feed line while the other serves as a return line for the motivating fluid: a control valve body having an opening therein and a pair of passages to be connected one each to one each of said conduits; a check valve in each of said passages to prevent a flow of fluid away from said motor, each of said passages having two ports on opposite sides of its check valve communicating with said opening of said body; and a shuttle member in said opening movable back and forth in response to changes in the relative fluid pressures in said conduits, said shuttle member having a bypass connecting the ports of one of said passages when it is in one of its extreme positions, and a second bypass connecting the ports of the other of said passages when said shuttle member is in the other of its extreme positions.

JOHN L. ATWOOD.
VLADIMIR H. PAVLECKA.